US006049188A

United States Patent [19]

Smith

[11] Patent Number: 6,049,188

[45] Date of Patent: Apr. 11, 2000

[54] SINGLE-PHASE MOTOR STARTERS

[76] Inventor: Otto J. M. Smith, 612 Euclid Ave., Berkeley, Calif. 94708

[21] Appl. No.: 08/746,251

[22] Filed: Nov. 7, 1996

[51] Int. Cl.[7] .............................. H02P 1/42

[52] U.S. Cl. .............................. 318/786; 318/781; 318/794

[58] Field of Search .............................. 318/778–797

[56] References Cited

U.S. PATENT DOCUMENTS

| | | | |
|---|---|---|---|
| 4,066,937 | 1/1978 | Pfarrer et al. | 318/775 |
| 4,378,520 | 3/1983 | Ford | 318/789 |
| 4,642,545 | 2/1987 | Lewus | 318/749 |
| 4,675,565 | 6/1987 | Lewus | 310/68 R |
| 4,792,740 | 12/1988 | Smith | 318/768 |
| 4,862,053 | 8/1989 | Jordan et al. | 318/786 |
| 5,017,853 | 5/1991 | Chmiel | 318/786 |
| 5,252,904 | 10/1993 | Nanos | 318/739 |
| 5,300,870 | 4/1994 | Smith | 318/768 |
| 5,545,965 | 8/1996 | Smith | 318/76 |

*Primary Examiner*—David Martin
*Attorney, Agent, or Firm*—Jerry G. Wright; Flehr Hohbach Test Albritton & Herbert LLP

[57] ABSTRACT

For a three-winding motor, a starting capacitor bank provides balanced currents in the windings, a high starting torque, and unity power-factor current in the single-phase supply line. A run-capacitor bank provides full-load balanced currents and a leading power-factor in the single-phase supply line. The method is applicable to a star or wye winding connection, to a delta winding connection, and to a Semihex™ winding connection.

50 Claims, 8 Drawing Sheets

SINGLE-PHASE MOTOR STARTERS

BACKGROUND OF THE INVENTION

This present invention is directed to an improved method of starting single-phase induction motors.

Many single-phase induction motors have a quadrature winding which is excited by a temporarily-inserted starting capacitor. The starting current of these motors is several times larger than the full-load line current. This high starting current is undesirable for large motors.

The use of starting capacitors for single-phase motors is taught in the U.S. Pat. No. 4,792,740 titled "THREE-PHASE INDUCTION MOTOR WITH SINGLE-PHASE POWER SUPPLY", issued Dec. 20, 1988 to Otto J. M. Smith. The use of starting capacitors for single-phase motors is also taught in U.S. Pat. No. 5,300,870 titled "THREE PHASE MOTOR CONTROL", issued Apr. 5, 1994 to Otto J. M. Smith. The use of starting capacitors for single-phase motors is also taught in U.S. Pat. No. 5,545,965, titled "THREE-PHASE MOTOR OPERATED FROM A SINGLE-PHASE POWER SUPPLY AND PHASE CONVERTER", issued Aug. 13, 1996 to Otto J. M. Smith. In some cases, the high starting current is not objectionable. For all large motors, however, and in many other cases, the high starting current is undesirable. This present invention is directed to an improved capacitor system to reduce the starting current and to improve the starting torque.

This method can be applied to all of the motors in the three U.S. Patents referenced above.

OBJECTS AND SUMMARY OF THE INVENTION

It is a general object of the present invention to provide a bank of starting capacitors for a single-phase motor such that the single-phase motor has improved starting torque and has a minimum starting current.

In accordance with the above object, there is provided a method whereby each of three motor windings has a capacitor in parallel with the corresponding winding. In addition, a fourth capacitor is connected to deliver a current of 0.5-power-factor into each winding. In addition, a fifth capacitor is connected across the supply line to adjust the line current power-factor.

DESCRIPTION OF PREFERRED EMBODIMENTS

Figure 1:
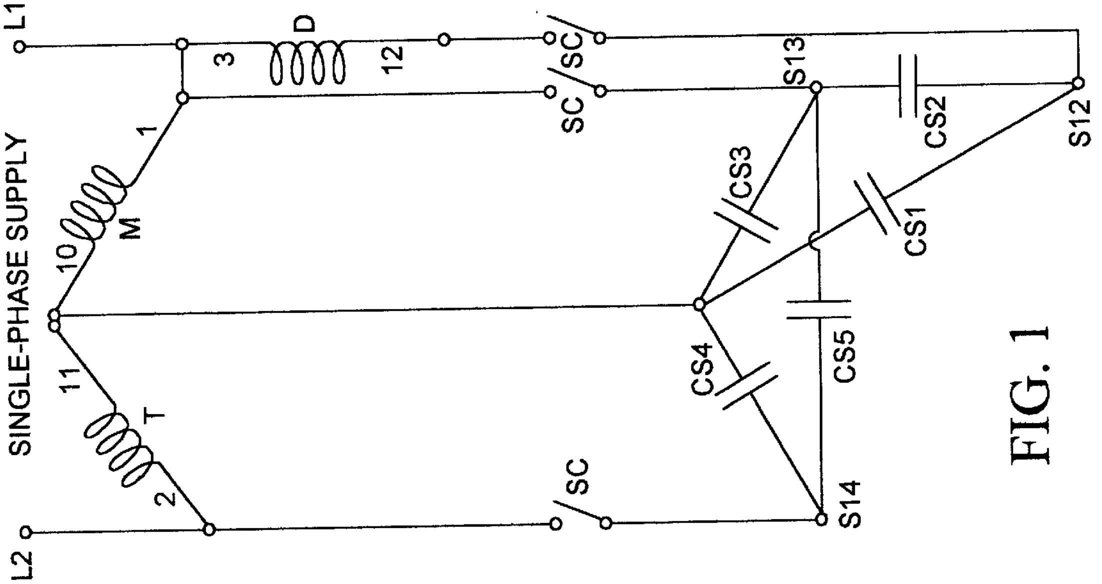
FIG. 1 is a circuit diagram of the connection of a bank of 5 starting capacitors to the Semihex™ windings of a 3-phase motor through a start contactor.

FIG. 1 shows a motor winding from FIG. 2B in U.S. Pat. No. 5,300,870. Motor terminals 1 and 3 are connected to the single-phase supply line L1. Motor terminal 2 is connected to the single-phase supply line L2. Motor terminals 10 and 11 are connected together. Motor terminal 12 is connected to one pole of the start contactor (SC), which connects 12 to terminal S12 when SC is closed during the starting transient. Motor terminal 3 is connected to a second pole of the start contactor (SC), which connects 3 to terminal S13 when SC is closed during the starting transient. Motor terminal 2 is connected to a third pole of the start connector (SC), which connects terminal 2 to terminal S14 when SC is closed during the starting transient.

The motor winding between 1 and 10 is designated the "M" winding, abbreviation for "Middle" winding. The motor winding between 3 and 12 is designated the "D" winding, abbreviation for "Driven" winding. The motor winding between 2 and 11 is designated the "T" winding, abbreviation for "Torque" winding.

Figure 5:
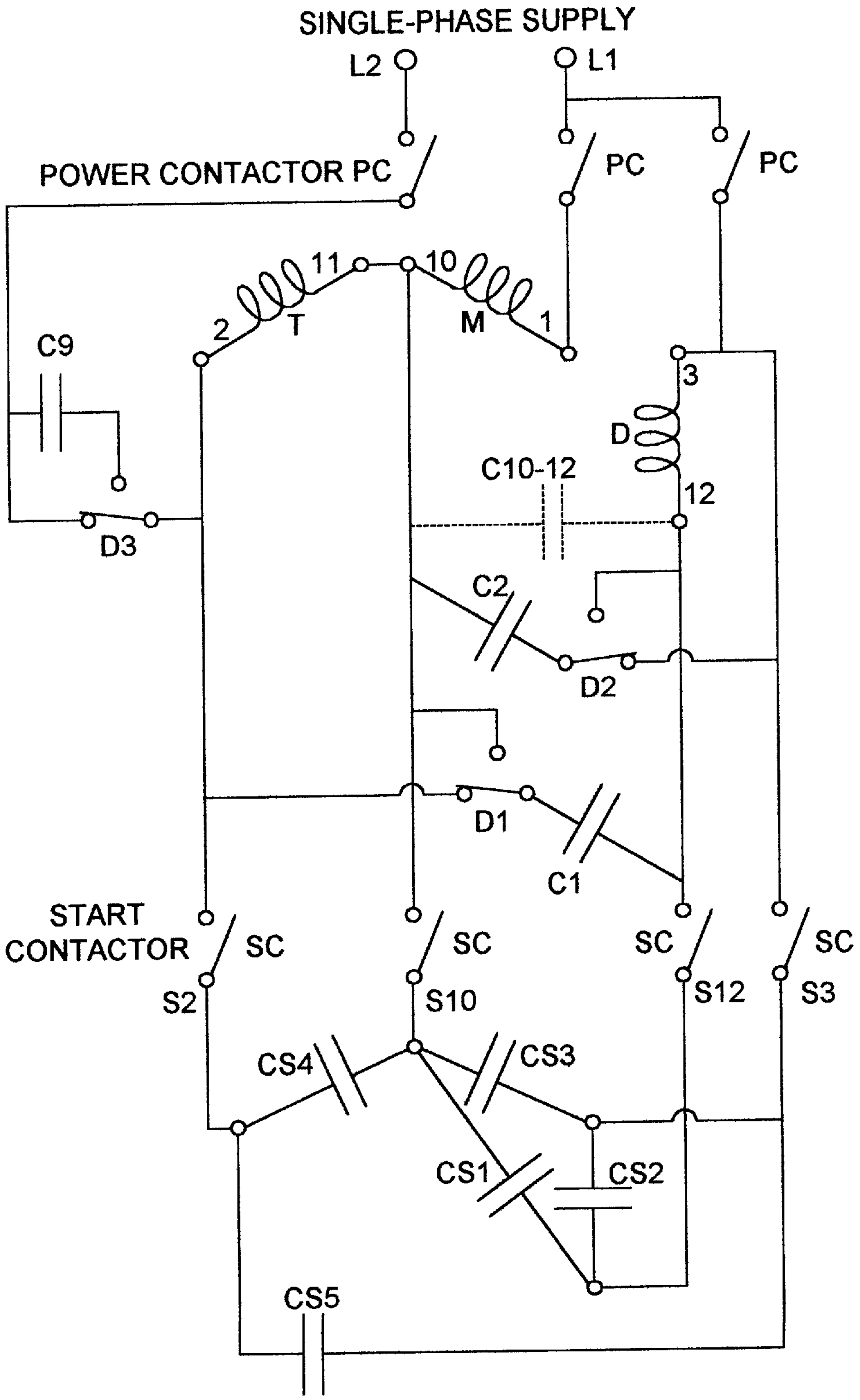
FIG. 5 is the circuit for a series-capacitor starter to reduce the starting current.

The motor-run capacitors for this motor are shown in FIG. 1 of U.S. Pat. No. 5,300,870 as C2-12, C10-12 and C1-10, and they are connected to terminals 2, 10, 3 and 12 during normal full-load operation. These run capacitors can be left connected during starting, or can be reconnected differently during starting. FIG. 5 illustrates the run capacitors C1 (C2-12), C2 (C1-10) and C10-12 (dashed outline). This last capacitor may be omitted in many cases as discussed in the '870 patent. This winding circuit is called the Semihex™ configuration. Such winding circuit as described in the '870 patent reconfigures the standard delta or wye connection by series connecting the windings which have 120° phase differences (note a delta has 60°).

Each winding marked D, M or T in FIG. 1 represents the actual motor windings, which in a dual-voltage six-winding motor can be two windings in series for the higher-voltage connection, or two windings in parallel for the lower-voltage connection.

Only start capacitors are shown in FIG. 1. Start capacitor CS1 is connected between terminals 10 and S12. Start capacitor CS2 is connected between terminals S12 and 13. Start capacitor CS3 is connected between terminals S13 and 10. Start capacitor CS4 is connected between terminals 10 and S14. Start capacitor CS5 is connected between terminals S13 and S14.

The start contactor SC is closed at the initial state of no speed, or "locked-rotor" state. The SC contactor opens all of its poles before the shaft speed reaches the rated full-load speed. This action can be controlled by a timer, or a speed sensor, or responsive to a starting current in either the supply line or one of the motor windings which current is larger than the full-load current. For example, a switch disconnects when a preselected time interval elapses or a shaft speed exceeds a preselected value. Such techniques are conventional.

At the locked-rotor state, capacitors CS1 and CS2 drive current components into the D-winding. These current components will be analyzed with respect to the phase angle of the voltage from 12 to 3 across the D-winding.

My notation is as follows:

WFL Full-load three-phase watts input

VAFL Full-load three-phase volt-amperes

IFL Full-load three-phase line current magnitude

PFFL Full-load three-phase power factor

ϕFL Full-load three-phase current lag angle

QFL Full-load VARS

WLR Locked-Rotor three-phase watts input

VALR Locked-Rotor three-phase volt-amperes

ILR Locked-Rotor three-phase line current magnitude

PFLR Locked-Rotor three-phase power factor

ϕLR Locked-Rotor three-phase current lag angle

QLR Locked-Rotor VARS

PS Starting watts input per phase

VAS Starting Volt-Amperes per phase

IS Starting current magnitude per phase

PFS Starting power-factor with respect to each phase

ϕS Starting current lag angle in each phase

QS Starting VARS input per phase

V Line-to-line voltage.

VS Volts per phase.

The first 10 items above are available from the motor factory. They are related as follows:

$$\phi FL = cos^{-1}(PFFL)$$

$$\phi LR = cos^{-1}(PFLR)$$

$$WFL = 1.732(IFL)(PFFL)V$$

$$WLR = 1.732(ILR)(PFLR)V$$

$$QFL = 1.732(IFL)V \sin(\phi FL)$$

$$QLR = 1.732(ILR)V \sin(\phi LR)$$

$$VAFL = \{WFL^2 + QFL^2\}^{0.5}$$

$$VALR = \{WLR^2 + QLR^2\}^{0.5}$$

Derived from these values above are the watts and vars below to be supplied from the start capacitor bank in FIG. 1.

$$PS = (WLR)/3$$

$$QS = (QLR)/3$$

$$\tan(\phi S) = (QS/PS)$$

$$\phi S = \tan^{-1}(QS/PS)$$

$$PFS = \cos(\phi S)$$

$$VAS = \{(PS)^2 + (QS)^2\}^{0.5}$$

$$IS = 1.732(VAS)/V$$

$$VS = V/(1.732)$$

The foregoing is an electrical alternating-current motor with several terminals, a first starting capacitor connected between a first and a second motor terminal, and a second starting capacitor connected between said first motor terminal and a third motor terminal.

Although this invention is described as applicable to electric motors, the same technique applies to generators also which is equivalent. It is well known that an induction motor becomes a generator when driven.

The analysis immediately below is for lossless capacitors of zero power factor, that is, no internal capacitor losses.

There are two components of the starting current IS being driven into D. The component from CS2 is Zero-Power-Factor (ZPF) designated (I90), because it lags behind the winding voltage VD from 12 to 3 by 90°. The component from CS1 is 0.5-Power-Factor or Half-Power-Factor (HPF) designated (I60), because it lags behind the winding voltage by 60°. The resolution of IS into these two components is:

$$(I60) = 2(IS)\sin(90-\phi S)$$

$$(I90) = 2(IS)\sin(\phi S-60)$$

The capacitor magnitudes for a 60-Hertz supply are:

$$CS1 = (I60)/(377\ V) = 2(IS)\sin(90-\phi S)/(377V)$$

$$CS2 = 1.732(I90)/(377\ V) = (2)(1.732)(IS)\sin(\phi S-60)/(337V)$$

CS1 injects into terminal 10 the negative of the (I60) into D. The combination of CS3 and CS4 injects into terminal 10 the negative of the (I90) into D when CS3 and CS4 have the same magnitude as CS2.

CS3=CS4=CS2

These are the correct values for balanced currents and voltages in the windings at Locked Rotor.

The magnetic lagging windings vars (MagLagVars) of D, M and T is QLR, lagging. The leading vars of the start capacitors excluding CS5 is:

$$VARS_S = V(I60) + 1.732\ V\ (I90),\ \text{leading}$$

The net lagging vars on the supply line without CS5 is $$VARS_{NET} = QLR - V\{(I60) + 1.732(I90)\}$$

When $VARS_{NET}$ is positive, then additional start capacitance CS5 can be added to bring the line power factor to unity.

$$I_{CS5} = VARS_{NET}/V$$

$$CS5 = I_{CS5}/(377\ V) = VARS_{NET}/(377\ V^2)$$

With these values in FIG. 1, the starting current locked-rotor (WLR)/V will be unity power-factor.

When $VARS_{NET}$ is negative, the capacitive vars exceeds the MagLagVars, and there is "too much" leading vars, so CS5 should be zero. This analysis immediately above is for capacitors with no internal losses.

Lossy Electrolytic Starting Capacitors

Conventional alternating-current electrolytic motor starting capacitors have a power-factor slightly less than 10 percent, that is, the current leads the voltage by more than 84.261°, but not 90°. The phase angle error of the capacitor current is therefore approximately 5.73°.

The current component from CS1 lags the D-winding voltage by 65.73°, not 60°. I call this current I(65). The current component from CS2 lags the D-winding voltage by 95.73°, not 90°. I call this current I(95).

The D-winding current (IS) at angle (ϕS) can be resolved into these two components.

$$I(65)=2(IS)\sin(95.73-\phi S)$$

$$I(95)=2(IS)\sin(\phi S-65.73)$$

99.5% of the current flows through each capacitance.

$$CS1=(0.995)(I65)/(377V)$$

$$CS2=(1.732)(I95)/(377V)$$

CS1 injects into terminal 10 the negative of the (I65) into D. The combination of CS3 and CS4 injects into terminal 10 the negative of the (I95) into D when CS3 and CS4 have the same magnitude as CS2.

CS3=CS4=CS2

These are the values for balanced currents and voltages in the windings at Locked Rotor with lossy capacitors.

The leading vars of the start capacitors from CS1 through CS4 is:

$$VARS_S=(0.995)V\{(I65)+1.732(I95)\}, \text{ leading}$$

The magnetic lagging motor windings vars (MagLagVars) of D, M and T is QLR, lagging.

The net lagging vars on the supply line without CS5 is:

$$VARS_{NET}=QLR-VARS_S.$$

$$VARS_{NET}=QLR-(0.995)V\{(I65)+1.732(I95)\}$$

When $VARS_{NET}$ is positive, then additional start capacitance CS5 can be added to bring the line power factor to unity.

$$I_{CS5}=VARS_{NET}/V$$

$$CS5=I_{CS5}/(377\ V)=VARS_{NET}/(377\ V^2).$$

With these values in FIG. 1, the starting current locked-rotor (WLR)/V will be unity power-factor.

The line watts input includes the capacitor losses. This is $$W_{LINE}=(WLR)+(0.1)(VARS_S+VARS_{CS5})$$

$$W_{LINE}=(WLR)+(0.1)(VARS_S+VARS_{NET})$$

The single-phase line current is:

$$I_{LINE}=W_{LINE}/V$$

Cost Saving

A cost savings can be realized by not using all of the CS5 calculated above. A CS5 vars reduction of $0.2W_{LINE}$ will make a change in the line current angle of 11° and the power factor will be reduced to 98%. For this savings:

$$NewCS5=(VARS_{NET}-(0.2)W_{LINE})/377V^2)$$

$$New\ W_{LINE}=(WLR)+(0.1)(VARS_S+VARS_{NET}-(0.2)W_{LINE})$$

$$NewI_{LINE}=NewW_{LINE}/V$$

I have invented an electrical alternating-current motor, a multipole starting contactor and a plurality of starting capacitors such that during the starting sequence, a first starting capacitor is connected in parallel with a first motor winding, and a second starting capacitor is connected in parallel with a second motor winding.

I have disclosed a single-phase motor starter design in which the locked-rotor line starting current is almost minimum and almost unity power factor. The single-phase starting torque is equal to the three-phase starting torque that would occur if the motor were reconnected for operation from a three-phase line.

For a multi-winding electrical motor, I have provided a multi-pole starting contactor, such that a first pole of the said contactor connects a first starting capacitor between two different terminals of the said motor, and such that a second pole of the said contactor connects a second starting capacitor between one of the said terminals and a third terminal of the said motor.

Capacitors for Winding VARS Only

Figure 2:
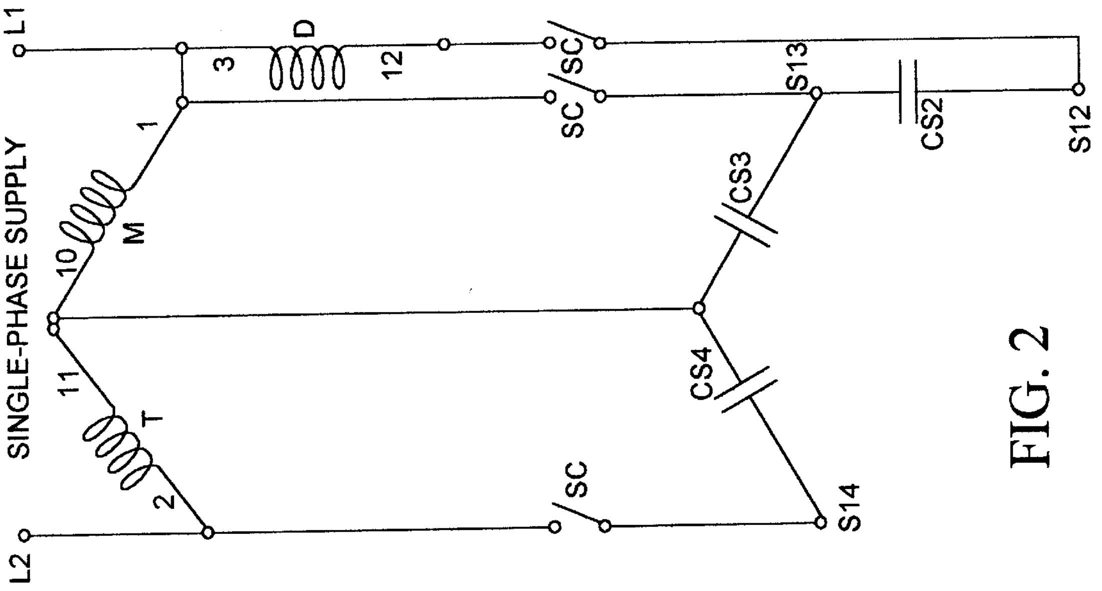
FIG. 2 is a circuit diagram of the 3 capacitors in FIG. 1 which carry zero-power-factor current (ZPFI) into three windings.

FIG. 2 is the portion of the capacitor bank in FIG. 1 which has the three capacitors designated of the type (ZPF), that is, CS2, CS3 and CS4. For this part of the circuit, CS2 is in parallel with D. CS3 is in parallel with M. CS4 is in parallel with T. Each capacitor provides leading reactive vars to its corresponding winding. None of these current components provide any real watts, or any real torque. The only component of the motor current which is coupled to the power in the power supply is the I60 or I65 component through CS1.

The windings are each carrying the current IS at a power factor of PFS. The phase representation of this current with respect to the winding voltage reference is (IS)((PFS)−j sin (ϕS)). Most of the sine component is supplied by each ZPF capacitor in FIG. 2. Most of the real (cosine) component is provided by the CS1 capacitor which is NOT in FIG. 2.

I have provided for an electrical motor, a multipole starting contactor and a plurality of starting capacitors such that during the starting sequence, a first starting capacitor is connected in parallel with a first motor winding, and a second starting capacitor is connected in parallel with a second motor winding.

Capacitors for Torque Components

Figure 3:
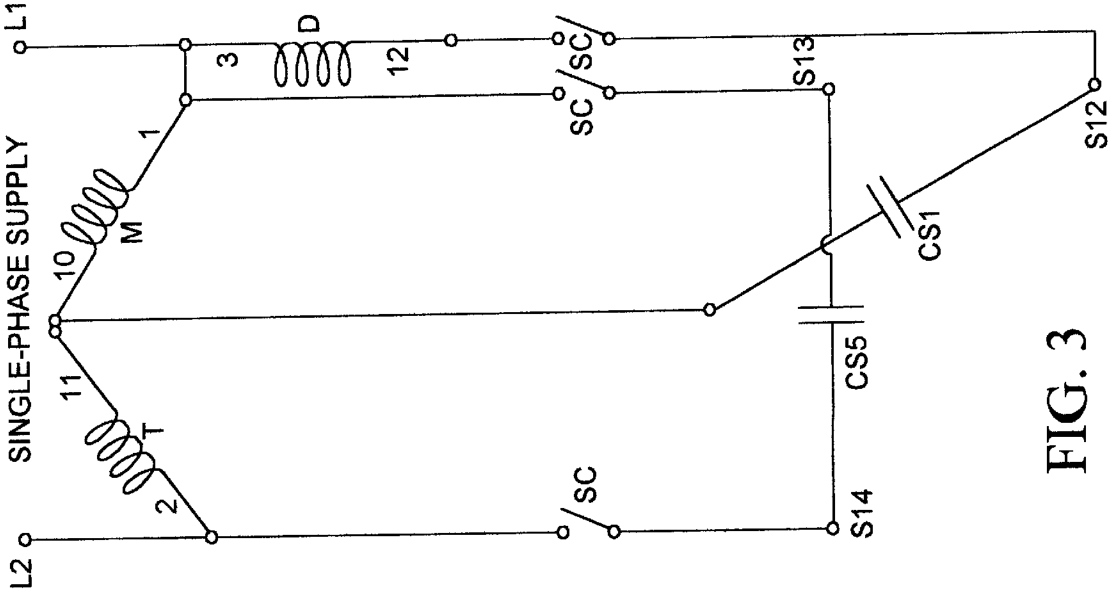
FIG. 3 is a circuit diagram of the two capacitors in FIG. 1 which deliver real power to the windings and which adjust the phase angle of the current in the single-phase supply.

FIG. 3 is the circuit with the two capacitors CS1 and CS5, being the two capacitors NOT in FIG. 2. CS5 is across the power supply. Capacitor CS1 can provide nearly all the power and torque components for the motor windings. CS1 drives each winding with the real component of (IS), which is (IS)(PFS). For winding D, CS1 is carrying the current (I60) or I(65), but it is not necessary to know this for the subsequent development of the lossless case. The current through CS1, ICS1, is of the form Real−j Imag.

Lossless Case

For a lossless capacitor, ICS1=(Real)−j 1.732 (Real) when the phase angle is 60° lagging. Therefore (Real)=(IS)(PFS). The imaginary part of this current is therefore Imag=1.732 (IS)(PFS). The magnitude of this current is ICS1=2(IS)(PFS). The magnitude of the capacitor is CS1=(ICS1)/(377V)=2(IS)(PFS)/(377V). The negative of these components flows into terminal 10, and produces balanced components in all of the windings. With respect to winding D, the vars per phase of ICS1 is 1.732(IS)(PFS)(V/1.732)=(IS)V(PFS).

The 90° (ZPF) component of the winding current in D is −j(IS) sin (ϕS). Part of this is provided by ICS1 as above. The remainder has to be provided by the capacitors in FIG. 2. When the capacitors are lossless zero power-factor, then the approximate analysis is that the remainder of this ZPF current is ICS2 which is provided by CS2 and is $$ICS2=(IS)\sin(\phi S)-1.732\,(IS)(PFS)$$

$$ICS2=(IS)\{\sin(\phi S)-1.732(PFS)\}=(IS)\{\sin(\phi S)-1.732\cos(\phi S)\}$$

$$ICS2=2(IS)\{\sin(\phi S)\cos 60-\cos(\phi S)\sin 60\}$$

$$ICS2=2(IS)\{\sin(\phi S-60)\}$$

$$CS2=(1.732)(ICS2)/(377V)=2(1.732)(IS)\{\sin(\phi S-60)\}/377V)$$

$$CS3=CS4=CS2$$

These are the values for FIG. 2.

In FIG. 3, ICS1=(IS)(PFS) (1−j1.732) as a phasor with respect to the D-Winding voltage. The MagLagVars which this is exciting is 1.732 V(IS)(PFS)/1.732. The same is true for the other two windings, M and T. The total MagLagVars for all three windings is 3V(IS) (PFS). The leading vars of CS1 is 2V(IS)(PFS). To bring the single-phase power supply line current to unity power factor, CS5 must provide the extra leading vars of V(IS)(PFS), which is half of the CS1 vars. Therefore, CS5=(CS1)/2 for lossless capacitors.

An available alternating-current electrolytic capacitor is usually sold with a range of possible microfarads within which its capacitance probably lies. It does not have a well defined value of capacitance. The internal losses are large, and the power factor is not zero. The losses in the capacitor bank in FIG. 1 will show up in the input locked-rotor line watts and line starting current.

Numerical Example

The windings of a 40-HP motor had a full-load power factor of 0.8961. To facilitate the design of the run capacitors, additional inductive reactance was added to bring the PFFL down to 0.866 and ϕFL to 30°. This method is shown later in FIG. 12. This 40-HP motor with V=230 v. had the following values:

TABLE I

| | WITHOUT INDUCTORS | WITH INDUCTORS |
|---|---|---|
| WFL = | 31,907 | 31,907 |
| VAFL = | 35,614 | 36,842 |
| IFL (3-phase) = | 89.4 | 92.48 |
| PFFL = | 0.8959 | 0.866 lag |
| ϕFL = | 26.370 | 30.00 lag |

TABLE I-continued

| | WITHOUT INDUCTORS | WITH INDUCTORS |
|---|---|---|
| QFL (3-phase) = | 15,821 | 18,422 lag |
| Inductor VARS | | 1,300 lag |

The motor alone without inductors on locked-rotor is:

WLR=87,017.

VALR=234,832.

ILR=589.48

PFLR=0.37055

ϕLR=68.25°

QLR=218,115.

The start capacitor bank should provide:

PS=(WLR)/3=(87,017)/3=29,006.

QS=(QLR)/3=(218,115))/3=72,705.

ϕS=$\tan^{-1}$ (2.507)=68.25°

PFS=cos (ϕS)=0.3706

VAS=78,277.

IS=1.732(VAS)/230=589.5

With lossless capacitors:

I60=436.87

I90=169.17

From these:

CS1=5,038. MFD

CS2=3,379. MFD

Or, from:

CS1=2(IS)(PFS)/(377V)=5,039. MFD

CS2=2(1.732)(IS)(sin(ϕS−60)/(377V)=3,379. MFD

With lossy capacitors:

I65=544.0 amperes

I95=51.8 amperes

CS1=6,242.4 MFD

CS2=1,029.5 MFD CS3=CS4=CS2

$VARS_{65}$=124,494.

$VARS_{95}$=20,534.

$VARS_{S}$=145,028.

$VAR_{NET}$=218,155−145,028=73,087.

$I_{CS5}$=317.8 amperes

CS5=3,665 MFD for unity power-factor

Line Watts=87,017+(0.1)(218,115)=108,829 watts

Line Current=473.2 amperes locked-rotor, unity power-factor.

For cost saving, reduce $VAR_{CS5}$ by (0.2) (Watts).

New$VAR_{CS5}$=73,087−21,766=51,321 var

New$I_{CS5}$=223 amperes

NewCS5=2,573 MFD

New Watts=87,017+(0.1)(145,028+51,321)=106,652 watts

New $Q_{LINE}$=21,766

NewVA=108,850

New$I_{LINE}$=473 amperes

New$\phi_{LINE}$=0.98

New$\phi_{LINE}$=11.5°

Total of all start capacitors is 11,904 MFD

The new line current with the smaller CS5 is the same as the line current using the larger CS5. The reduction in capacitor losses balanced the reduction in line vars. If CS5 is omitted completely, the line current will increase by approximately 13%.

Motor Run Capacitors, 230 Volts Supply

With inductors, the motor has an 86.6% power factor, and the full-load I30=IFL delivered by CS1 has exactly the correct phase angle of 30°.

Without inductors, I choose a C1 to deliver a current IFL into D which has a phase lag angle of 30°, instead of the 26.4° in Table I. This C1 is 893 MFD.

To adjust the phase angle of the current in the M winding, I choose a C2 to deliver a current IC2=(IFL)(PFFL)/(0.866). This current IC2=92.5 amperes, not 89.4 amperes. C2=1848 MFD.

TABLE II

| FULL-LOAD STATE | WITHOUT INDUCTORS | | WITH INDUCTORS | |
|---|---|---|---|---|
| WFL = | 31,907 | | 31,907 | |
| QFL (3 windings) = | 15,821 | var lag | 18,422 | var lag |
| IC1 | 89.4 | | 92.5 | |
| 1C2 | 92.5 | | 92.5 | |
| C1 = | 893 | MFD | 924 | MFD |
| C2 = | 1,848 | MFD | 1,848 | MFD |
| VAR-C1 | 23,745 | var lead | 24,565 | var lead |
| VAR-C2 | 12,283 | var lead | 12,283 | var lead |
| Q-Line | 20,207 | var lead | 18,426 | var lead |
| VA-Line | 37,767 | va | 36,845 | va |
| I-Line-FL | 164 | amps | 160 | amps |
| PF FL | 0.845 | | 0.866 | |
| ϕFL | 32.3° | | 30.0° | |

During starting, the lossless motor-run capacitors can be switched to be in parallel with CS1, and reduce the magnitude of the additional electrolytic capacitors needed.

TABLE III

STARTING STATE, C1 AND C2 IN PARALLEL WITH CS1

| CAPACITOR | WITHOUT INDUCTORS | | WITH INDUCTORS | |
|---|---|---|---|---|
| C1 = | 893 | MFD | 924 | MFD |
| C2 = | 1,848 | MFD | 1,848 | MFD |
| Total lossless | 2,741 | MFD | 2,772 | MFD |
| Lossless Cap. I | 237.7 | amps | 240.4 | amps |
| Lossless VARS | 54,665. | var | 55,283. | var |
| Total CS1 needed | 6,242 | MFD | 6,242 | MFD |
| Net lossy CS1 | 3,501 | MFD | 3,470 | MFD |
| Watts reduction in cap. losses: | 5,467 | watts | 5,528 | watts |
| Watts input, Locked-rotor | 101,185 | watts | 101,124 | watts |
| Q-Line | 21,766 | var | 21,766 | var |
| VA-Line | 103,500 | va | 103,440 | va |
| I-Line, LR | 450 | amps | 450 | amps |
| Locked rotor current as % of full-load: | 274% | | 281% | |

I have provided an electrical motor with four terminals, a first starting capacitor connected between a first and a second motor terminal, and a second starting capacitor connected between a third motor terminal and a fourth motor terminal.

Figure 4:
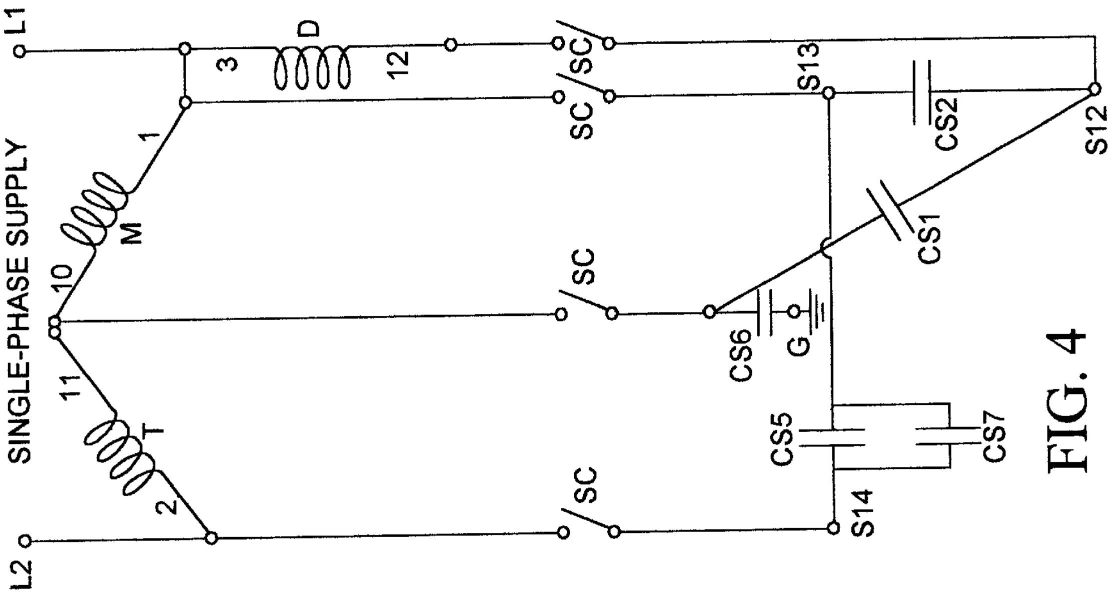
FIG. 4 is a simplification of FIG. 2.

FIG. 4 is a simplification of FIG. 2. The two capacitors CS3 and CS4 in FIG. 2 can be replaced by CS6 in FIG. 4.

CS6 is connected between terminal 10 and terminal G, which is ground, or the center-tap of the power supply. Most electrical codes require the ground terminal to be brought into the control box, so the terminal G is available. In FIG. 2, lossless CS3 and CS4 each carry (I90), which are 120° apart in phase. The phasor sum is also (I90), in magnitude. Lossless CS6 delivers (I90) with half of the voltage, so that CS6 is two times CS3.

The vars contributed by CS3 and CS4 was 2(1.732)(I90) V/(3). The vars contributed by CS6 is only (1.732)(I90)V/(6). To bring the line power-factor to unity, an addition to CS5 must provide the difference vars of (1.732)(I90)V/(2). The additional current in parallel with CS5 would be (1.732) (I90)/2. The additional capacitor CS7 in parallel with CS5 would be:

$$CS7=(1.732)(I90)/(2\times 377\ V).$$

I have described an electrical alternating-current motor with four winding terminals and a single-phase power supply with three supply terminals, means to connect a first motor terminal to a first supply terminal, means to connect a second motor terminal to a second supply terminal, means to connect a first starting capacitor between said first motor terminal and a third motor terminal, means to connect a second starting capacitor between said third motor terminal and a fourth motor terminal, and means to connect a third starting capacitor between said fourth motor terminal and a third supply terminal.

Series Capacitor Starter

FIG. 5 is the circuit for a Semihex™ motor with a series-capacitor starter. This also is a reduced-flux starter. The motor connections are the same as in FIG. 1. Line L1 of the single-phase supply is connected through one pole of the power contactor PC to winding terminal 1. Line L1 is connected through another pole of PC to winding terminal 3. Terminal 3 is connected through one pole of the start contactor SC to terminal S3. Winding terminal 12 is connected through another pole of SC to terminal S12. Winding terminal 10 is connected through another pole of SC to terminal S10. Winding terminal 2 is connected through another pole of SC to terminal S2. Terminals S2, S3, S10 and S12 are all unenergized during the run state, and are all energized during the start state. The start capacitors are connected as follows: CS1 is connected between S10 and S12. CS2 is connected between S3 and S12. CS3 is connected between S3 and S10. CS4 is connected between S2 and S10. CS5 is connected between S2 and S3.

Run capacitor C1 is connected from 12 through a double-throw switch D1 to 2 for the NC run mode, and to 10 for the NO start mode. Run capacitor C2 is connected from 10 through a double-throw switch D2 to 3 for the NC run mode, and to 12 for the NO start mode. A third run capacitor C10-12 is optional as discussed above.

Terminal 2 is connected through a double-throw switch D3 to the supply line L2 for the NC run mode, and is connected through the series start capacitor C9 to line L2 for the NO start mode.

The start contactor SC and the double-throw switches D1, D2 and D3 are shown in the unenergized RUN state in FIG. 5. The power contactor PC is shown in the unenergized OFF state in FIG. 5. All of the switches and contactors in FIG. 5 will be in the "Pulled-Up" state for the initial locked-rotor starting.

The five start capacitors and the two run capacitors have magnitudes chosen in accordance with the description for FIG. 1 so that the motor between terminals 2 and 3 has unity power factor at the locked-rotor state. Capacitor CS5 is chosen to accomplish this unity-power-factor state. The motor impedance between 2 and 3 is a pure resistance R.

The motor starting current also flows through the impedance of the series capacitor C9. The voltage drop through C9 is subtracted from the supply voltage, so that the motor voltage is reduced, and this will reduce the motor current to a desired and acceptable value.

The 40-HP motor alone, without the series capacitor C9, without cost saving and without inductors has unity power factor on locked rotor with CS5 of 3659 MFD. The total lossless vars of C1 and C2 is 54,665. The total lossy vars of the five starting capacitors is 163,450. The sum of these two is the 218,115. vars needed to satisfy the MagLagVars of the motor windings. The capacitor losses are 16,345 watts. The total input watts is 103,362 watts. The unity-power-factor current is 103,362/230=449.4 amperes. The motor terminals equivalent resistance is R=230/449.4=0.5118 ohms.

Figure 6:
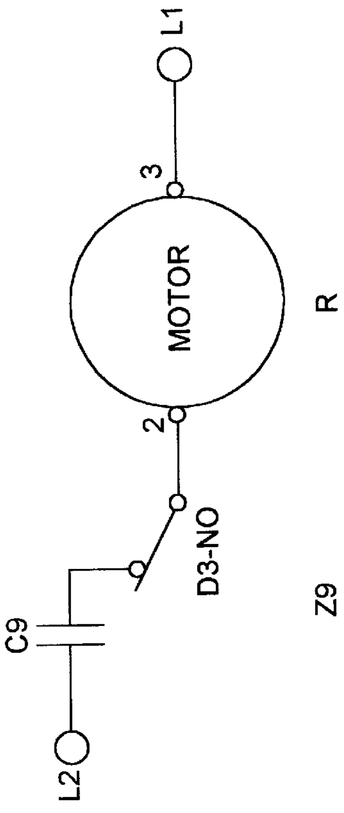
FIG. 6 is the equivalent circuit for the motor and the series capacitor for FIG. 5.

This numerical example for a 40-HP motor on 230 volts has the capacitor values that cause the motor to draw 449.4 amperes unity power factor. The equivalent circuit for the motor system between 2 and 3 is a pure resistance R of 0.5118 ohms. This is shown in FIG. 6.

The lossy electrolytic capacitor C9 has a phasor impedance Z9 equal to (0.1−j 0.995)|Z9| ohms. This is shown in FIG. 6 in series with R.

The impedance presented to the power company is the sum of R+(0.1−j 0.995)|Z9|.

As a numerical example, I select 8750 MFD for C9 for the 40-HP motor. Z9 is thus Z9=0.03047−j0.30315. The total of Z9 plus R of 0.5118 is R+Z9=0.5423−j 0.30315=0.6213 ∠−29.21°. The line current is I=230/0.6213=370.2 amperes. The voltage drop across the motor is (0.5118) (370.2)=189.5 volts. The voltage, the current, and the flux in the motor have all been reduced to 82.4%. The torque has been reduced to 67.9%.

The voltage across the capacitor C9 is (0.3047)(370.2)=112.8 volts. This is consistent with commercial capacitors rated 125 volts. A smaller C9 might require a higher-voltage, more expensive capacitor. The reduction in torque might not be desirable. A larger C9 for less voltage drop would cost more because low-voltage motor-start capacitors are not available.

The power contactor PC has three poles. When the motor is turned off, and is coasting to a stop, terminal 1 is disconnected from terminal 3. This prevents self-excitation as an induction generator by the capacitors C1 and C2, since there is no circuit for the capacitor currents.

I have provided an alternating-current motor starter for a three-winding motor, a two-line single-phase supply, a series capacitor, a starting capacitor, said motor windings connected in series with sequential terminals 1, 2, 3 and 4, said series capacitor connected between a first line of said supply and motor terminal 1, said starting capacitor connected between motor terminal 2 and motor terminal 4, and motor terminal 3 connected to the other line of said supply.

Three-Winding Three-Terminal Motor

Figure 7:
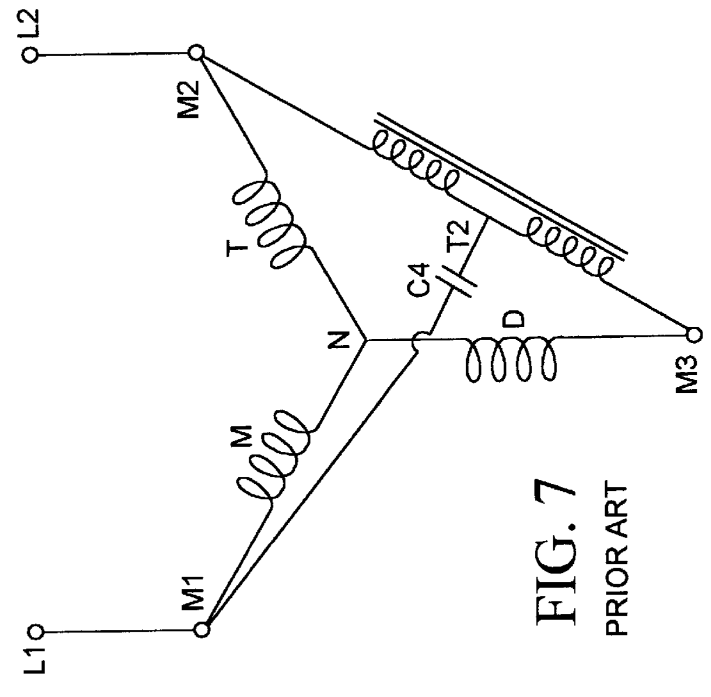
FIG. 7 is a three-phase three-terminal motor being driven from a single-phase line, wherein a transformer is used to drive the driven winding D with a single run capacitor C4.

U.S. Pat. No. 5,545,965 shows in FIG. 1 a three-winding three-terminal single-phase motor with a transformer to drive the driven winding at terminal M3. In this referenced patent, the windings are connected in a star, but could also be connected in a delta. FIG. 7 (equivalent to FIG. 1 of the '965 patent) herein is also a three-winding three-terminal three-phase motor being driven from a single-phase line, wherein a transformer is used to drive the driven winding D at terminal M3 with a run capacitor C4. The motor in FIG. 7 herein has a star connection of the windings, but because there are only three terminals, it could also be a delta connection. Motor terminals M1 and M2 are connected to the single-phase line terminals L1 and L2, respectively. The motor phase winding from M1 to the neutral N is designated M. The motor phase winding from M3 to neutral N is designated T. The motor phase winding from M3 to neutral N is designated "D", an abbreviation for "Driven" winding. A tapped autotransformer is connected between terminals M2 and M3. This transformer has a tap T2 which can be anywhere but usually within the central half of the winding. For a motor with a full-load power-factor of 86.6%, the tap T2 will be in the middle of the winding. A run capacitor C4 is connected between terminal M1 and tap T2. Approximately half of the capacitor current flows from T2 to M3 and enters winding D. This is the full-load current (IFL). A current (IT2M2) flows from T2 to M2. The ampere-turns of IFl equals the ampere-turns of IT2M2. The capacitor current IC4=IFL+IT2M2. With this circuit, the phase sequence of the motor terminal voltages is M1, M2, M3 and the shaft rotation is CCW. The full-load motor winding vars is QFL, which is approximately (0.866)(IFL)V for an 86.6% power-factor motor. The capacitor voltage is approximately (0.866) V. The capacitor current is approximately 2(IFL). The capacitor leading vars is approximately (1.732(IFL)V. The capacitor leading vars is approximately double the motor MagLagVars, so the full-load single-phase power factor is 86.6% LEADING.

Figure 8:
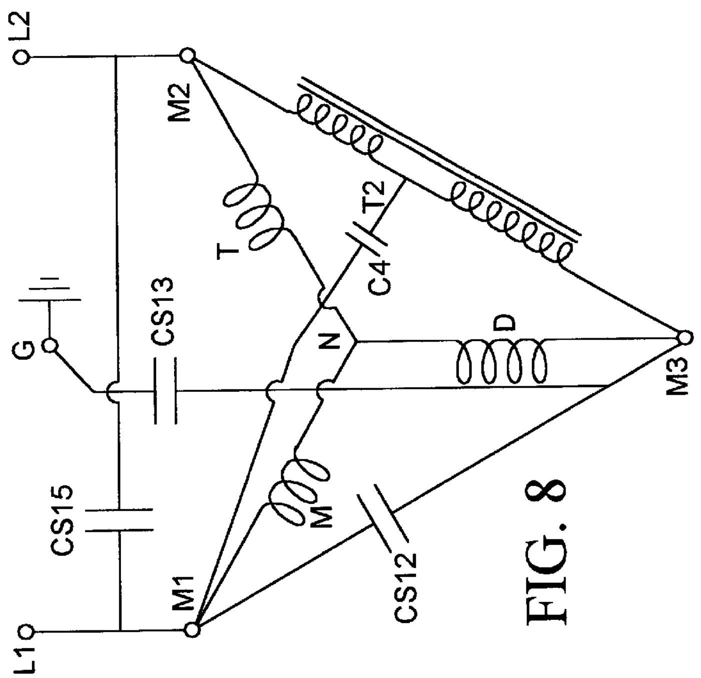
FIG. 8 is the same motor as in FIG. 7, with start capacitors CS12, CS13, and CS15.

FIG. 8 is the same motor as in FIG. 7, with start capacitors CS12, CS13 and CS15. When the start contactor is closed, CS12 is connected between M1 and M3, and drives winding D with a current component (I65) which lags the voltage from M3 to N by 65°. This current provides most of the starting torque and most of the starting watts input. When the starter contactor is closed, capacitor CS13 is connected between M3 and ground G, the center-tap of the power supply system. This capacitor drives winding D with the current component (I95), which lags the voltage from M3 to N by 95°. This current represents the locked-rotor magnetizing vars in D not supplied by CS12.

$$I65=2(IS)\sin(95-\phi S)$$

$$I95=2(IS)\sin(\phi S-65)$$

$$C12=0.995(I65)/(377\,V)$$

$$C13=0.995(I95)/(377\times 0.866\times V)$$

$$Q65=(I65)V$$

$$Q95=(I95)(0.866)V$$

When the start contactor is closed, optional capacitor CS15 is connected between M1 and M2. The current in this capacitor adjusts the power system power factor so that the locked-rotor initial transient current has a high power factor or is unity power factor. For C15 to adjust to unity power factor:

$$Q15=QLR-Q65-Q95$$

$$I15=(Q15)/V$$

$$C15=(Q15)/(377\,V^2)$$

These three starting capacitors can be selected so that the locked-rotor initial starting state has balanced voltages and balanced currents in the three windings, D, M and T, and the single-phase starting torque is the same as if the motor were excited by a balanced three-phase supply.

I have provided a three-winding electrical motor with three motor terminals, said windings being connected in either a star connection or a delta connection, a single-phase supply with three supply terminals, means to connect a first supply terminal to a first motor terminal, means to connect a second supply terminal to a second motor terminal, means to connect a first starting capacitor between a third motor terminal and said first motor terminal, and means to connect a second starting capacitor between said third motor terminal and a third supply terminal.

Figure 9:
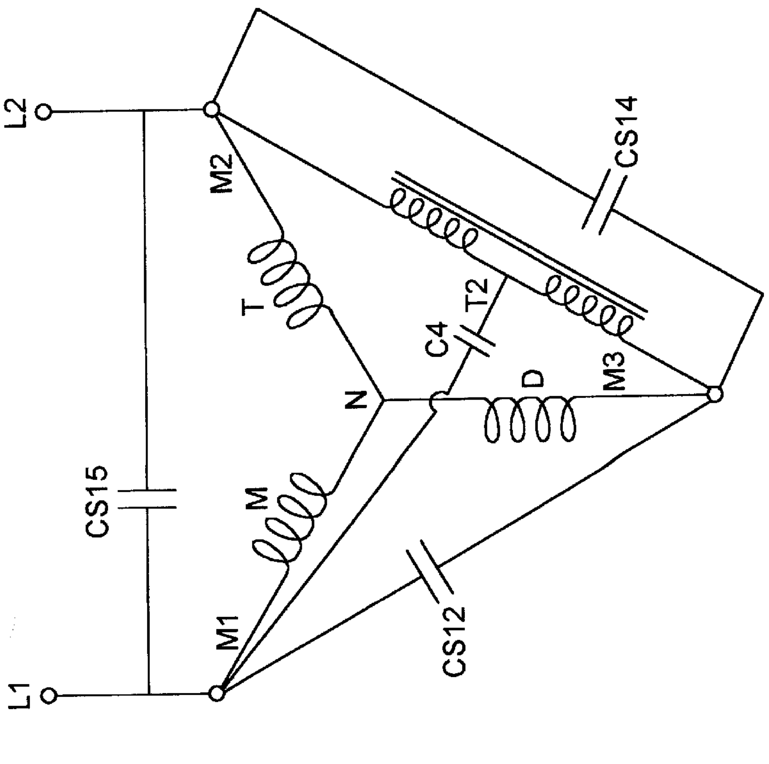
FIG. 9 has the same motor as FIG. 7 and FIG. 8, with the addition of start capacitor CS14 connected between M3 and M2.

FIG. 9 has the same motor as FIG. 7 and FIG. 8. CS14 is connected between M3 and M2 and carries current I14. Current IS is resolved into the two components I14 and I65 which are 60° apart.

$$I14=(1.155)(IS)\sin(\phi S-65)$$

$$I65=I12=(IS)\cos(\phi S-65)-(0.5774)(IS)\sin(\phi S-65)$$

By comparison with I95 above for CS13, CS14 carries (0.577) times the current in CS13, at a voltage which is 15.5% higher, so that the magnitude of CS14 is:

$$CS14=(CS13)(0.866)/(1.732)=(CS13)/2$$

The new I65 in FIG. 9 is greater than the old I65 in FIG. 8 by (1.155) (IS) sin(φS−65). CS12 in FIG. 9 is increased from CS12 in FIG. 8 by the amount of (CS13)/2.

In FIG. 8, the vars of CS13 is (CS13)(377) (0.75)$V^2$. In FIG. 9, the vars of CS14 is (CS13)(377)(0.5)$V^2$. The increase in CS12 vars is also (CS13)(377)(0.5)$V^2$. The composite change in vars from FIG. 8 to FIG. 9 is an increase of (CS13)(377)(0.25)$V^2$. The CS15 in FIG. 9 should be reduced from the CS15 in FIG. 8 by this amount of (CS13)/4.

I have provided a three-winding a-c electrical motor with three motor terminals, a single-phase supply with a plurality of terminals, means to connect a first capacitor between a first motor terminal and a second motor terminal, means to connect a first supply terminal to said first motor terminal, means to connect a second capacitor between said second motor terminal and one other of the plurality of supply terminals, said other supply terminal having a substantial voltage between it and the said first supply terminal, and means to connect a third motor terminal to a supply terminal which has a predetermined voltage between it and the said first supply terminal.

I have provided a star-connected three-winding electrical motor with three motor terminals, a single-phase supply with two supply terminals, means to connect a first supply terminal to a first motor terminal, means to connect a second supply terminal to a second motor terminal, means to connect a first starting capacitor between a third motor terminal and said first motor terminal, and means to connect a second starting capacitor between said third motor terminal and said second motor terminal.

Hybrid Start and SemiHex Circuit

Figure 10:
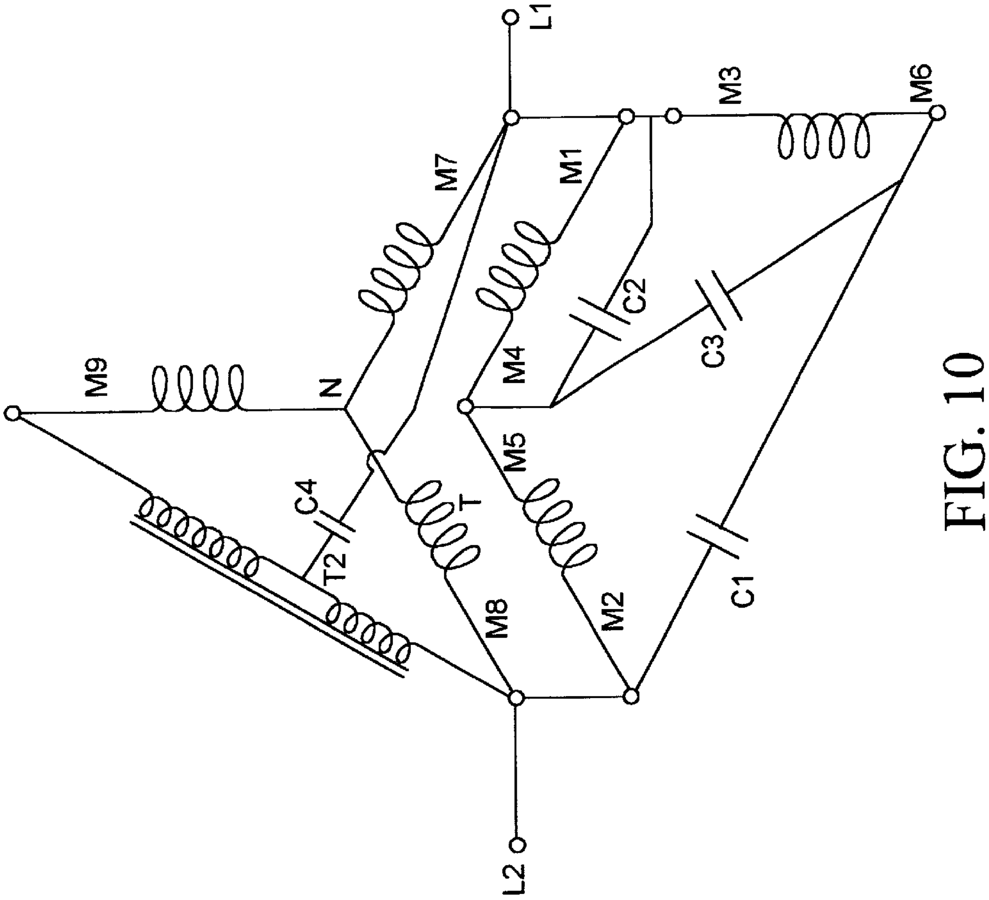
FIG. 10 shows a six-winding motor in which three of the windings are connected as in FIG. 1, for a Semihex™ half-motor, and three of the windings are connected as in FIG. 8, for a star half-motor. Run capacitors are shown.

FIG. 10 shows a six-winding motor in which three of the windings are connected as in FIG. 1, for a Semihex™ half-motor, and three of the windings are connected as in FIG. 8, for a star half-motor. Run capacitor C1 is connected between M2 and M6. Run capacitor C2 is connected between M1 and M4. Run capacitor C3 is connected between M4 and M6. Run capacitor C4 is connected between M7 and T2.

For motors with full-load power factors near or larger than 86%, run capacitor C3 is not needed. The advantages of this circuit are that only nine motor terminals are brought out, and the size of the autotransformer is less than in FIG. 7.

If the autotransformer is center-tapped, then for φFL of 30° and PFFL of 0.866, C3 is zero, C1 carries (IFL)/2, C2 carries (IFL)/2 and C4 carries (IFL). For PFFL less than 0.866, an approximation is for C4 to carry (IFL), C1 and C2 carry {(I30)−(IFL)/2} and C3 carries (I60). The star half-motor is running at 86.6% power factor, and the Semihex™ half-motor is running at a lower power factor, so that the average power factor is approximately correct.

For a motor with a power factor larger than 0.866, C3 is zero, and the lower Semihex™ half-motor can operate at the 0.866 power factor. The tap T2 on the autotransformer can be located so that the voltage from M9 to T2 is larger than the voltage from T2 to M8. The current through C4 will cause the star half-motor to operate at a power-factor larger than 0.866. The average of these two power-factors of the two half-motors can be approximately correct.

I have provided a six-winding electrical motor with a plurality of motor terminals, a single-phase power supply with two supply terminals, a transformer with three transformer terminals, means to connect a first supply terminal to a first motor terminal, means to connect a second supply terminal to a second motor terminal, a first transformer terminal connected to said second motor terminal, a second transformer terminal connected to a third motor terminal, a first capacitor connected between said first motor terminal and a third transformer terminal, and a second capacitor connected between said second motor terminal and a fourth motor terminal.

I have provided a six-winding electrical motor with a plurality of motor terminals, a single-phase power supply with two supply terminals, a transformer with three transformer terminals, means to connect a first supply terminal to a first motor terminal, means to connect a second supply terminal to a second motor terminal, a first transformer terminal connected to said second motor terminal a second transformer terminal connected to a a third motor terminal, a first capacitor connected between said first motor terminal and a third transformer terminal, a second capacitor connected between said second motor terminal and a fourth motor terminal, a third capacitor connected between said first motor terminal and a fifth motor terminal, and a fourth capacitor connected between said fourth motor terminal and said fifth motor terminal.

Figure 11:
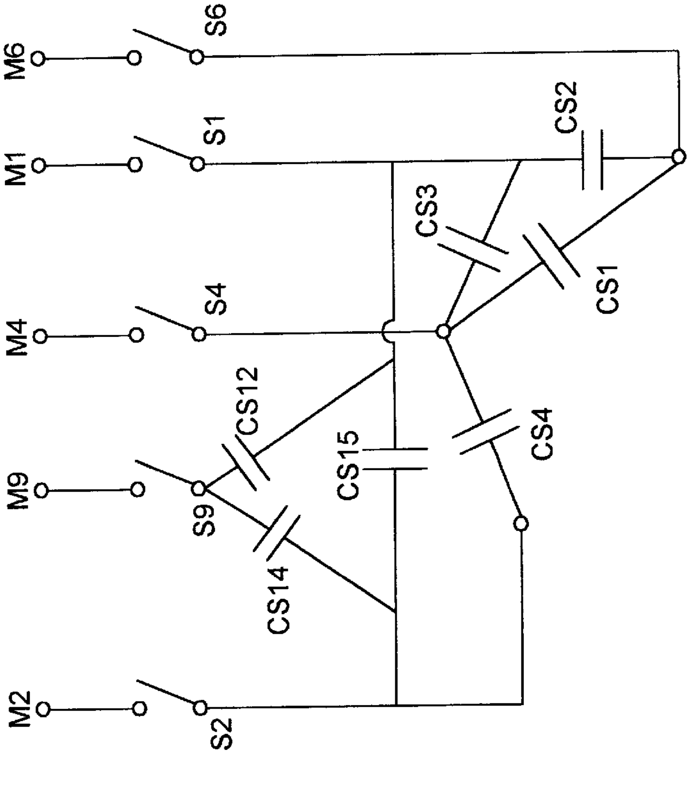
FIG. 11 is the circuit diagram for the start capacitors for FIG. 10.

FIG. 11 is the circuit diagram for the start capacitors for FIG. 10. A six-pole start contactor disconnects the start capacitor bank when the shaft speed is near full-load speed. The start capacitors have the notation and the functions described previously for FIG. 2 and FIG. 9. The switched contacts for the motor terminals M1, M2, M4, M6 and M9 are designated S1, S2, S4, S6 and S9, respectively. CS1, CS2, CS3 and CS4 are the starting capacitors for the lower Semihex™ half-motor. CS12 and CS14 are the starting capacitors for the upper three-terminal half-motor. This half-motor is shown star connected. CS15 is the capacitor across the single-phase power line during starting, which capacitor can adjust the locked-rotor line power-factor to near unity.

I have provided a six-winding electrical motor with a plurality of motor terminals, single-phase power supply with two supply terminals, a bank of several starting capacitors with a plurality of capacitor terminals, means to connect a first supply terminal to a first motor terminal, means to connect a second supply terminal to a second motor terminal, means to connect a first capacitor terminal to the said first motor terminal, means to connect a second capacitor terminal to the said second motor terminal, means to connect a third capacitor terminal to a third motor terminal, and means to connect a fourth capacitor terminal to a fourth motor terminal.

Inductor Reduction of Power-Factor

Figure 12:
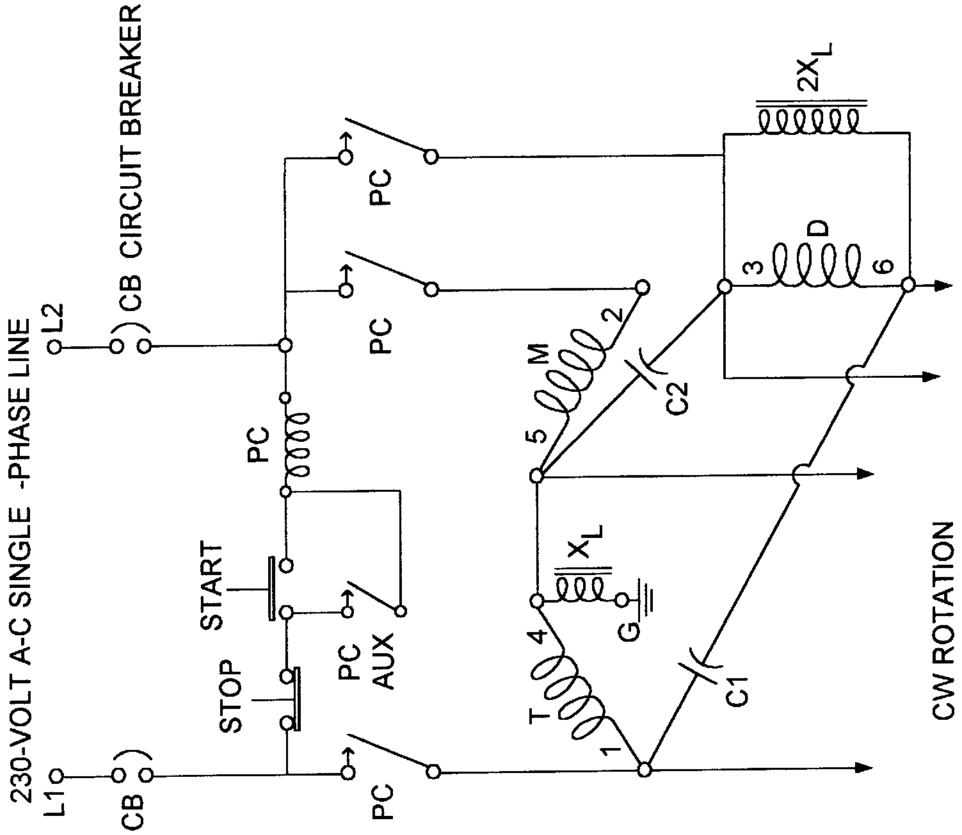
FIG. 12 has inductors added to bring the full-load power factor down to 86.6%.

FIG. 12 has inductors added to bring the full-load power factor down to 86.6%. This was the method referenced in the numerical example following FIG. 1 and the second column of TABLE I. A first inductor is connected between terminal 4 and a ground terminal G. The ground terminal is usually available at the center-tap of a 230-volt supply, since the code requires that it be brought to the control cabinet. The second inductor is connected between terminal 3 and terminal 6.

The second inductor carries a current internal to the inductor from 6 to 3 which lags the voltage from 6 to 3 by 90°. Equivalently, one can say that the second inductor drives a current component into the winding D at 6 which leads the voltage from 6 to 3 across the winding by 90°. The effect of this second inductor is to make the winding D appear to be more inductive to the capacitor C1.

Large motors can have power factors higher than 0.866. For simplicity in the design and use of capacitor C1, it is desirable for the motor to have a full-load power factor of only 0.866. The value of the second inductor is so chosen that at full load, the composite parallel circuit of the winding D and the inductor in parallel has a composite power factor of 0.866. C1 injects a current into terminal 6 which has this 0.866 power-factor with respect to the voltage from 6 to 3.

A motor with a full-load current of IFL, power-factor of PFFL, and angle ϕFL can have a parallel lossless inductor carrying a current of IL=(IFL) {(cosϕFL)/1.732−sin ϕFL}. As phasors with respect to the winding voltage from 6 to 3, these currents are:

$$ID=(IFL)\{\cos \phi FL-j \sin \phi FL\}$$

$$IL=(IFL)(-j)\{(\cos \phi FL)/1.732-\sin \phi FL\}$$

The sum is INEW∠? which is $$INEW=ID+IL=(IFL)\{\cos \phi FL-j\ (\cos \phi FL)/1.732\}$$

This has a lagging phase angle of $$\phi NEW=\tan^{-1}(1/1.732)=-30°$$

The magnitude of INEW is (IFL)(PFFL)/(0.866)

$$C1=(INEW)(1.732)/(2\times 377\times V)=(IFL)(PFFL)/(377\ V)$$

The negative of this current IC1 is injected into terminal 4 by C2. The first inductor connected from 4 to G reduces the power-factor of winding T between 4 and 1 and winding M between 5 and 2 to the composite power-factor of 0.866 at terminal 4.

A motor with a full-load current of IFL, power-factor of PFFL, and angle ϕFL has a first inductor current of IL=(IFL){(cos ϕFL)/1.732−sinϕFL). The inductor reactance is $X_L$=V/(2×1.732×IL) ohms. The new apparent motor current that is carried by C2 is INEW=IFL(cos ϕFL)/(0.866).

At terminal 6 of winding D, the second inductor has the voltage (V/1.732), which is twice the voltage of the first inductor of (V/3.464), and both carry the same current, IL. The second inductor reactance is therefore $2X_L$ ohms.

Capacitor C2 is 1.732(INEW)/(377 V). Capacitor C1 is C2/2.

The first numerical example of FIG. 1 in TABLE I was for a motor whose full-load current was 89.4 amperes, at PFFL of 0.8959, ϕFL of 26.38°. The first inductor current calculated as above was IL=6.5257 amperes. The new apparent motor current INEW was 92.48 amperes. The first inductor reactance $X_L$ was 10.175 ohms. The second inductor reactance $2X_L$ was 20.35 ohms. These are 27 and 54 millihenries, respectively. The new power-factor for the design of the capacitors was 86.6%. C2 was 1848 MFD and C1 was 924 MFD.

I have provided a multi-winding a-c electrical motor, a single-phase supply, an inductor and a capacitor, a first winding terminal connected to a first supply terminal, a second winding terminal connected to a second supply terminal, the inductor connected between a third winding terminal and said second supply terminal, and the capacitor connected between said first winding terminal and said third winding terminal.

I have provided a multi-winding electrical motor, a three-terminal single-phase supply, two inductors and two capacitors, a first winding terminal connected to a first supply terminal, a second winding terminal connected to a second supply terminal, a first inductor connected between a third winding terminal and a third supply terminal, a second inductor connected between a fourth winding terminal and said second winding terminal, a first capacitor connected between said first winding terminal and said fourth winding terminal, and a second capacitor connected between said second winding terminal and said third winding terminal.

Half-Voltage Starting of Large Motor

Figure 13:
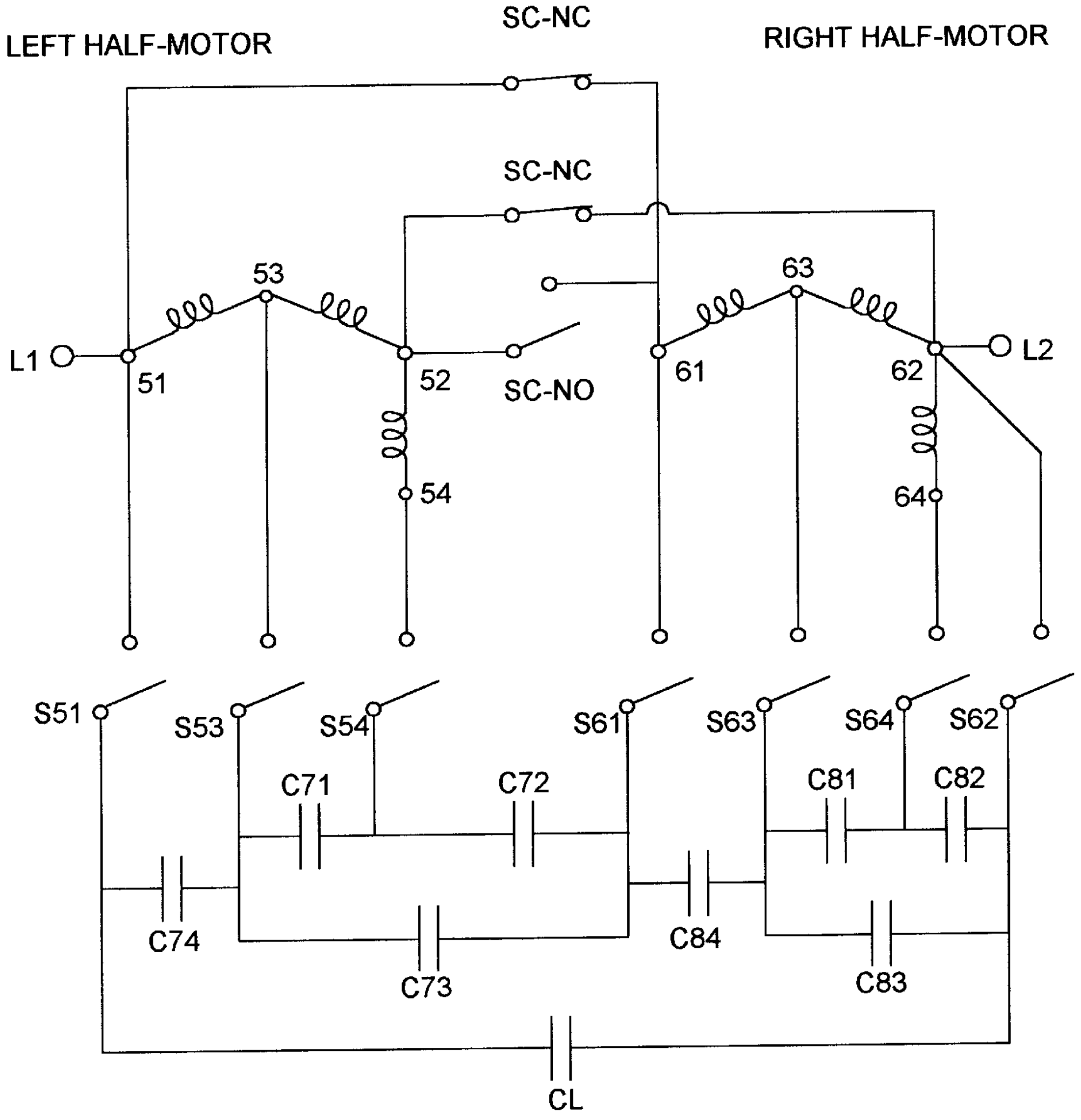
FIG. 13 is the circuit for a half-flux, half-voltage starter.

Very large motors, or high impedance single-phase power lines, require low starting currents. Half voltage and half flux in a motor will produce one-fourth starting torque. FIG. 13 is the circuit for this starter. The six-winding motor is divided into two three-winding half motors. These two half-motors are in parallel for normal running, and they are in series for the half-flux starting mode.

The left half-motor has external terminals 51 and 52, and internal terminals 53 and 54. The Semihex™ windings are in series between 51 and 54. The right half motor has external terminals 61 and 62, and internal terminals 63 and 64. The Semihex™ windings are in series between 61 and 64. Power line L1 is connected to 51 and power line L2 is connected to 62. Normally-closed contacts SC-NC of the start contactor SC connect 51 to 61 and 52 to 62. In this state, the two half-motors are in parallel for normal operation.

A normally-opened contact SC-NO of the start contactor connects 52 to 61. When the coil of SC is energized, the NO contacts close and the NC contacts open. The two half-motors are then in series, and each receives half-voltage. Terminals 61 through 64 are connected through a multipole start contactor to terminals S61 through S64, respectively. Terminal 51 and terminals 53 and 54 are connected through the multipole start contactor to terminal S51 and terminals S53 and S54, respectively.

The start capacitor connections are listed in TABLE VII.

TABLE VII

| START CAPACITORS | | |
|---|---|---|
| CAPACITOR NAME | CONNECTED BETWEEN | |
| C71 | S53 | S54 |
| C72 | S54 | S61 |
| C73 | S53 | S61 |
| C74 | S51 | S53 |
| C81 | S63 | S64 |
| C82 | S64 | S62 |
| C83 | S62 | S63 |
| C84 | S61 | S63 |
| CL | S51 | S62 |

Capacitors C71 and C81 perform the same functions as CS1 in FIG. 1. Capacitors C72 and C82 perform the same functions as CS2 in FIG. 1. The role of the other capacitors is similarly defined by the parallelism of the circuits and notation in FIGS. 1 and 13.

I have disclosed a six-winding motor with starting means to connect four of the windings in series during starting, means for each of four capacitors to be connected across each of four windings, a line of a single-phase power supply connected to one terminal of one of said windings, and a capacitor connected between said one terminal and a terminal of one of the other two windings.

Reduced Voltage Starter

Figure 14:
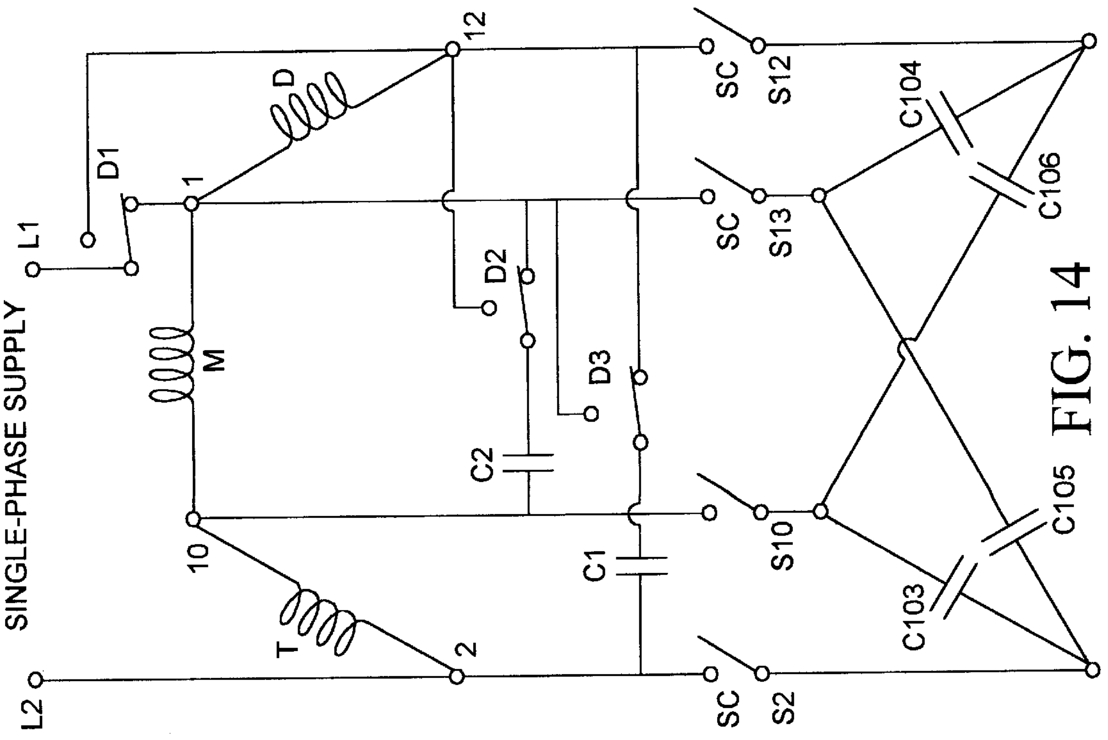
FIG. 14 is a reduced-voltage starter.

This reduced voltage starter, RVS, is for a Semihex™ motor with three windings. FIG. 14 shows the starting circuit. With this circuit, the voltages are reduced to 86.596% and the torque is reduced to 75% of the value that it would have at full voltage. Winding M is between terminals 1 and 10, and carries current IM from 10 to 1 initially during starting. Winding T is between terminals 2 and 10, and carries current IT from 10 to 2 initially during starting. Winding D is between terminals 1 and 12, and carries current ID from 1 to 12 initially during starting. 1 is connected to 3 and to one pole of a starting contactor SC whose other contact is terminal S13. 10 is connected to 11 and to one pole of a starting contactor SC whose other contact is S10. Line L2 is connected to 2 and to one pole of a starting contactor SC whose other contact is terminal S2. 12 is connected to one pole of a starting contactor SC whose other contact is terminal S12.

Start capacitor C103 is connected between S2 and S10, and carries current I103 from 2 to 10. Start capacitor C104 is connected between S12 and S13, and carries current I104 from S12 to S13. Start capacitor C105 is connected between S2 and S13, and carries current I105 from S12 to S13. Start capacitor C106 is connected between S12 and S10, and carries current I106 from S12 to S13.

Supply Line L1 is connected through a double-throw switch D1 to terminal 1 for-normal operation, and to terminal 12 for starting at reduced voltage on the windings. Run capacitor C2 is connected between terminal 10 and a double-throw switch D2. In normal operation, D2 connects C2 to terminal 1. During starting, D2 connects C2 to 12, Run capacitor C1 is connected between terminal 2 and a double-throw switch D3. In normal operation, D3 connects C1 to terminal 12. During starting, D3 connects C1 to 1. All contactors and switches in FIG. 14 are shown in the Run state with the coil for SC not energized and SC not pulled up. In the start state, all armatures pull up.

For the first analysis of the Start state, assume that run capacitors C1 and C2 are completely disconnected. The T5 possible currents that can be carried by the lossy electrolytic starting capacitors are:

TABLE IV

| | CURRENT | | | |
|---|---|---|---|---|
| Capacitor | NAME | FROM | TO | ANGLE |
| C103 | I103 | 2 | 10 | 144.3° |
| C104 | I104 | 12 | 1 | −155.7° |
| C105 | I105 | 2 | 1 | 114.5° |
| C106 | I106 | 12 | 10 | −125.7° |

The two currents I103 and I106 are orthogonal, that is, they are 90° apart. The two currents I104 and I105 are orthogonal, that is, they are 90° apart.

The Reduced-Voltage notation for this motor is:

WRV watts input to windings

VARV volt-ampere input to windings

IRV amperes in each winding

PFRV power-factor in each winding

φRV current lag angle after voltage phasor in winding

QRV vars input to all windings.

Table V has the start currents inserted at nodes 10 and 1.

TABLE V

| START STATE CURRENTS | | | |
|---|---|---|---|
| NODE | NAME | MAGNITUDE | ANGLE |
| 10 | IT | IRV | −(120 + φRV) |
| 10 | IM | IRV | −φRV |
| 10 | I10 = IT + IM | IRV | −60 − φRV |
| 1 | ID | IRV | −60 − φRV |
| 1 | −IM | IRV | 180 − φRV |
| 1 | I1 = ID − IM | IRV | −120 − φRV |

The current I10 can be resolved into the two currents I103 and I106, and from these, the capacitor values can be calculated. The current I1 can be resolved into the two currents I104 and I105, and from these, the capacitor values can be calculated. This is illustrated by the following example for reduced flux.

The same motor used in the previous numerical example has the starting state with reduced voltage of 199.2 volts:

V=230 volts

WRV=65,363 watts

VARV=176,117

IRV=510.5

PFRV=0.3705

φRV=68.25°

QRV=163,579 vars

The reduced voltage across each winding is 115 volts. The voltage from 2 to 1 and from 10 to 12 is 199 volts. The voltage from 2 to 12 is 230 volts.

At 10, I106 is 2.55° from I10, and I103 is 87.45° from I10.

$$I106=510.5\cos 2.55°=510.0$$

$$I103=510.5\cos 87.45°=22.713$$

$$C106=510/(377\times199.2)\ C106=6{,}791\text{ MFD}$$

$$C103=22.713/(377\times115)\ C103=524\text{ MFD}$$

At 1, I104 is 32.550 from I1, and I105 is 57.45° from I1.

$$I104=510.5 \cos 32.55°=430.31$$

$$I105=510.5 \cos 57.4°=274.67$$

$$C104=430.31/(377\times115)\ C104=9{,}925\ \text{MFD}$$

$$C105=274.67/(377\times199.2)\ C105=3{,}657\ \text{MFD}$$

Lossy capacitors with a power factor of 0.1 have a vars equal to 0.995 times the volt-amperes. The capacitive VA and Q for each capacitor are:

TABLE VI

| VA | VA | Q, VARS |
|---|---|---|
| C103 = 22.713 × 115 = | 2,612 | 2,599 |
| C104 = 430.31 × 115 = | 49,486 | 49,239 |
| C105 = 274.67 × 199.2 = | 54,714 | 54,441 |
| C106 = 510.0 × 199.2 = | 101,592 | 101,084 |

The sum of all capacitive Q=207,363. vars. The MagLag-Vars of the windings is QRV=163,579. The difference is the power line starting vars. $Q_{START}$=207,363−163,579=43,784 vars leading.

The capacitive losses are (0.1)(Q). The total losses total 20,736 watts. The power line input watts is the sum of these losses to the motor losses WRV of 65,263 to equal 85,999 watts.

The line input at L2 is the sum of I103, I105, and −IT. This is:

$$I103=22.713\angle 144.3°=-18.45+j13.25$$

$$I105=274.67\angle 114.5°=-113.90+j249.94$$

$$-IT=510.5\angle -8.25°=505.22-j73.25$$

$$IL2=418.46\angle 27.0°=372.87+j189.94$$

The line input at L1 is the sum of I104, I106, and −ID. This is:

$$I104=430.31\angle -155.7°=-392.19-j177.08$$

$$I106=510.0\angle -125.7°=-297.61-j414.16$$

$$-ID=510.5\angle 51.75°=316.05+j400.90$$

$$IL1=419.43\angle -153.01°\ 153.01°=-373.75-j190.34$$

IL1 should equal IL2 in magnitude. The difference is accumulated computational errors. The conservative estimate is the larger, IL1=419.43 amperes. The line watts and vars from this is P+jQ=85,963+j43,778. This current is the initial locked-rotor current when C1 and C2 are disconnected. This value is only slightly different than the previously calculated value of 85,999+j43,784.

C1 and C2 are lossless. They can be used to substitute for lossy capacitors during starting, and reduce the watts input required. In FIG. 14 double-throw switch D2 connects C2 in parallel with C106 for starting, and C106 can be reduced by the amount of C2. Double-throw switch D3 connects C1 in parallel with C105 for starting, and C105 can be reduced by the amount of C1.

The run capacitors in the first column of TABLE II for no inductor are 893 MFD for C1 and 1848 MFD for C2. On starting, C1 has 199.2 volts across it, carries 67.1 amperes, and contributes 13,359 vars. On starting, C2 has 199.2 volts across it, carries 138.8 amperes, and contributes 27,649 vars. These two lossless capacitors deliver 41,008 vars, displacing the same number of vars in lossy electrolytic capacitors. This saves 4101 watts of losses during starting.

The line P+jQ has been improved to:

$$P+jQ=81{,}862+j43{,}778=92{,}833\angle 28.1°$$

The initial starting line current has been reduced to 404 amperes at 0.882 power factor leading. This starting current is consistent with what can be delivered by a 400-ampere, 230-volt, single-phase distribution service.

In summary, the sum of all of the start capacitors is 18,156 MFD, and the two run capacitors have 2741 MFD.

In FIG. 14, during starting, the voltages on each winding have a certain phase relationship with respect to the power system voltage. When the contactors all change to the run mode, the phase angles of these relationships move to 30° more lagging with respect to the power system voltage.

I have disclosed a reduced-voltage starting circuit, wherein three machine windings are connected in series with four terminals, a two-line single-phase power supply, a first capacitor is connected between a first machine terminal and a second machine terminal, a second capacitor is connected between said first machine terminal and a third machine terminal, a third capacitor is connected between said second machine terminal and a fourth machine terminal, a fourth capacitor is connected between said third machine terminal and said fourth machine terminal, one line of the said supply is connected to said first machine terminal, and the other line of the said supply is connected to said fourth machine terminal.

Double Star Connection

Figure 15:
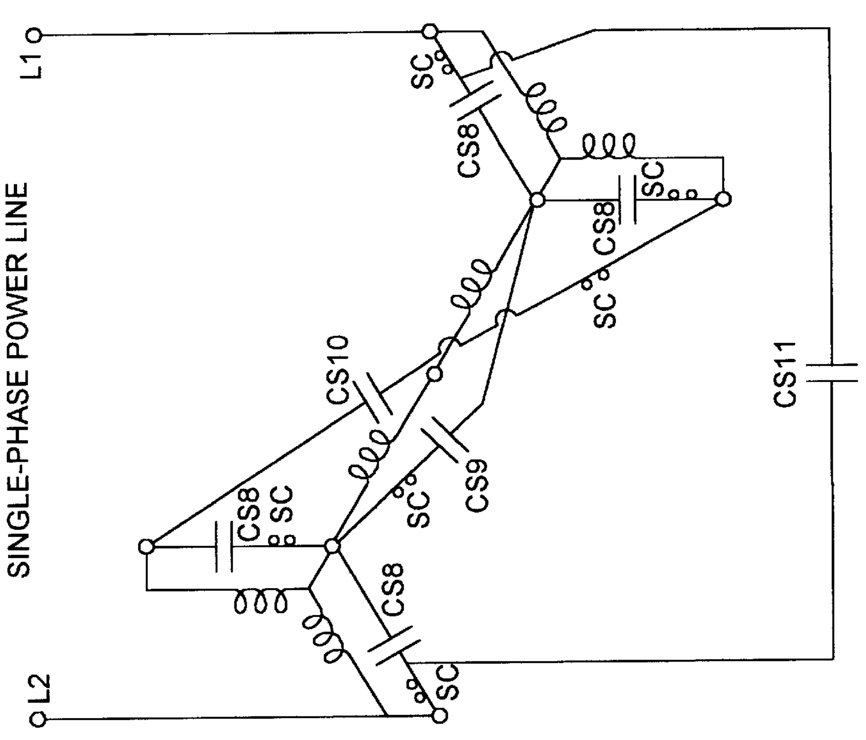
FIG. 15 is a dual-wye three-phase motor connection to a single-phase power source.

U.S. Pat. No 4,792,740 issued Dec. 20, 1988 to Otto J. M. Smith, has in FIG. 1 a six winding three-phase motor with the windings connected in a pair of star or wye connections, the pair connected in series between the terminals of a single-phase power supply, and run capacitors 107, 108, and 109 provided to excite the windings with balanced currents and voltages at full load. This complete system is duplicated herein in my FIG. 15. In the FIG. 15 herein, the run capacitors are imbedded inside the circuit of the six windings, and are not individually shown. In FIG. 15, additional start capacitors are shown individually. These are marked CS11, CS10, CS9, and four different CS8. In series with each start capacitor is the contacts of a start contactor SC, whose contacts are closed during starting, and whose contacts open near full speed. At normal shaft loads, all of the capacitors showing in FIG. 15 are disconnected.

Capacitor CS11 performs the same function as CS5. Capacitor CS10 performs the same function as CS1. Capacitors CS8 perform the same functions as CS2 and CS4. Capacitor CS9 performs the same function as CS3.

The CS9 capacitor is in parallel with two series windings whose total voltage is V/(1.732). This is the same voltage as across winding M and capacitor CS3. Therefore:

$$CS9=CS3=2(1.732)(IS)\{\sin(\phi-65)\}/(377V)$$

The CS8 capacitors are each across a winding with the voltage V/(3.464). These capacitors carry the full (I95) current at half of the voltage across CS2 or CS4. Therefore CS8 must be twice as large as CS2.

$$CS8 = 2(CS2) = 4(1.732(IS)\{\sin(\phi S - 65)\}/(377V)$$

CS10 provides the (I65) current at the same voltage as CS1. CS10=CS1.

CS11 provides the same power-factor correction as CS5 at the same voltage. CS11=CS5.

I have provided an electrical motor with six windings and multiple winding terminals, a first starting capacitor connected in parallel with a first winding between a first terminal and a second terminal, a second starting capacitor connected in parallel with a second winding between the said second terminal and a third terminal, and a third starting capacitor connected between said third terminal and a fourth terminal.

What is claimed is:

1. In an electrical alternating-current motor driven by a single phase power supply and having at least three motor windings of different phases, a multipole starting contactor and a plurality of starting capacitors including switching means operable during the starting sequence where a first starting capacitor is connected in parallel with a first motor winding, and a second starting capacitor is connected in parallel with a second motor winding.

2. A three-winding electrical motor as in claim 1, with a plurality of motor terminals, said single-phase power supply having two supply terminals, a transformer with three transformer terminals, means to connect a first supply terminal to a first motor terminal, means to connect a second supply terminal to a second motor terminal, a first transformer terminal connected to said second motor terminal, a second transformer terminal connected to a third motor terminal wherein said first starting capacitor is connected between said first motor terminal and said third motor terminal and wherein said second starting capacitor is connected between said second motor terminal and said third motor terminal, and a motor-run capacitor connected between said first motor terminal and a third transformer terminal.

3. A three-winding electrical motor as in claim 2, a third starting capacitor connected between said second motor terminal and said first motor terminal.

4. An electrical motor as in claim 1, with a third starting capacitor which is connected in parallel with a third motor winding.

5. A motor as in claim 4, with a plurality of motor terminals, said single phase power supply having two lines, there being six of the said motor windings, at least three motor windings of different voltage phases, means to connect four of the said windings in series, a first winding connected between a first terminal and a second terminal, a second winding connected between said second terminal and a third terminal, a third winding connected between said third terminal and a fourth terminal, a fourth winding connected between said fourth terminal and a fifth terminal, said first starting capacitor connected between said first terminal and said second terminal, said second starting capacitor connected between said fourth terminal and said fifth terminal, means for said third starting capacitor to be connected between said second terminal and said fourth terminal, one line of said single-phase power supply connected to said first terminal, and the other line of said single-phase power supply connected to said fifth terminal.

6. A motor as in claim 4, wherein said motor has four terminals, a first motor winding connected between a first and a second terminal, a second motor winding connected between said second terminal and a third terminal, a third motor winding connected between said third terminal and a fourth terminal, where said first starting capacitor is connected between said first terminal and said third terminal, said second starting capacitor is connected between said third terminal and said second terminal, said third starting capacitor is connected between said second terminal and said third terminal, one line of said single-phase power supply is connected to said second terminal, and electrical circuit means between said other line of said single-phase power supply and said fourth terminal.

7. An alternating-current motor starter as in claim 6 for a three-winding motor including a series capacitor, said motor windings connected in series with 120° phase differences with the said four sequential motor terminals 1, 2, 3 and 4, said series capacitor being the said electrical circuit means between said other line of said single-phase power supply and said terminal four.

8. A starter as in claim 7, with third and fourth starting capacitors, said third starting capacitor connected between motor terminals 2 and 4, and said fourth starting capacitor connected between motor terminals 3 and 4.

9. A starter as in claim 8, with a fifth starting capacitor connected between motor terminals 2 and 1.

10. A starter as in claim 8, wherein said third starting capacitor capacitance is selected to make the impedance between motor terminals 2 and 4 resistive.

11. A starter as in claim 7, wherein the capacitance of said series capacitor is chosen so that the voltage between motor terminals 1 and 3 is less than the voltage between the two lines of the said power supply.

12. A motor as in claim 4, wherein one terminal of said first capacitor is connected to one terminal of said second capacitor, the other terminal of said first capacitor is called "one available" terminal, the other terminal of said second capacitor is called "another available" terminal and wherein a fourth starting capacitor is connected between the said one and another available terminals of the series circuit formed by the said first capacitor and the said second capacitor.

13. An electrical motor as in claim 1 having a reduced-voltage starting circuit wherein said three motor windings are connected in series, a first motor winding being connected between a first and a second terminal, a second motor winding being connected between said second terminal and a third terminal, a third motor winding being connected between said third terminal and a fourth terminal, said single-phase power supply having two lines, where said first capacitor is connected between said first terminal and said second terminal, a third capacitor is connected between said first terminal and said third terminal, a fourth capacitor is connected between said second terminal and said fourth terminal, said second capacitor is connected between said third terminal and said fourth terminal, one line of the said supply is connected to said first terminal, and the other line of the said supply is connected to said fourth terminal.

14. A motor as in claim 13, including a first motor-run capacitor connected between said first terminal and said fourth terminal, and a second motor-run capacitor connected between said second terminal and said third terminal.

15. A motor as in claim 1, wherein said second motor winding is a series circuit of a plurality of motor windings.

16. In an electrical alternating-current motor as in claim 1, wherein said motor has three motor terminals, a first individual motor winding connected between a first motor terminal and a second motor terminal, a second individual motor winding connected between the said second motor terminal and a third motor terminal, said first starting capacitor being a switchable temporarily-connected intermittent-duty capacitor connected between said first and said second motor terminals, and said second starting capacitor being a switchable temporarily-connected intermittent-duty capacitor connected between said first motor terminal and said third motor terminal.

17. An electrical motor as in claim 16, with a third switchable temporarily-connected intermittent-duty starting capacitor connected between said second motor terminal and said third motor terminal.

18. An electrical motor as in claim 16, with a fourth motor terminal, a third individual motor winding connected between said fourth motor terminal and one of the other said motor terminals, with a third switchable temporarily-connected intermittent-duty starting capacitor connected between said fourth motor terminal and one of the other said motor terminals.

19. An electrical motor as in claim 16, said single-phase power supply having two supply terminals, means to connect one of said motor terminals to a first supply terminal, a fourth motor terminal, a third individual motor winding connected between said fourth motor terminal and one of the other said motor terminals, means to connect said fourth motor terminal to a second supply terminal, and means to connect said third switchable temporarily-connected intermittent-duty starting capacitor between said fourth motor terminal and one of the other said motor terminals.

20. An electrical motor as in claim 17, with a third individual motor winding connected between said third motor terminal and a fourth motor terminal, with a fourth starting capacitor connected between said first terminal and said fourth terminal.

21. An electrical motor as in claim 16, with a third individual motor winding connected between said third motor terminal and a fourth motor terminal, with a third starting capacitor connected between said fourth motor terminal and one of the other said motor terminals.

22. An electrical motor as in claim 16, with a plurality of motor terminals, said single-phase power supply having two supply terminals, a transformer with three transformer terminals, means to connect a first supply terminal to said third motor terminal, means to connect a second supply terminal to said second motor terminal, a first transformer terminal connected to said first motor terminal, a second transformer terminal connected to said second motor terminal, and a third capacitor connected between said third motor terminal and a third transformer terminal.

23. An electrical motor as in claim 16, with a plurality of motor terminals, said single-phase power supply having three terminals, a transformer with three transformer terminals, means to connect a first supply terminal to said first motor terminal, means to connect a second supply terminal to said second motor terminal, means to connect a third capacitor between said third motor terminal and a third supply terminal, means to connect a first transformer terminal to said second motor terminal, means to connect a second transformer terminal to said third motor terminal, and means to connect a fourth capacitor between said first motor terminal and said third transformer terminal.

24. An electrical motor as in claim 17, with a third individual motor winding connected between said third motor terminal and a fourth motor terminal, with a fourth starting capacitor connected between said fourth motor terminal and one of the other said motor terminals.

25. An electrical alternating-current motor as in claim 16 driven by a grounded center-tap single phase power supply including a fourth motor terminal said single-phase power supply having three supply terminals, means to connect a first motor terminal to a first supply terminal, means to connect a second motor terminal to a second supply terminal, and means to connect a third starting capacitor between said fourth motor terminal and said third supply terminal.

26. A motor as in claim 25, with a fourth starting capacitor connected between said second motor terminal and said fourth motor terminal.

27. A motor as in claim 1, including a single-phase power supply with a grounded center-tap and two other lines, three individual motor windings being connected in series forming a sequence of four motor terminals, a first individual motor winding connected between the first and second motor terminals, a second individual motor winding connected between the said second motor terminal and the third motor terminal, a third individual motor winding connected between the said third motor terminal and a fourth motor terminal, said first motor winding being identical to the said second individual motor winding, said second motor winding being the series connection of said first individual motor winding and said second individual motor winding, a first inductor connected between said first motor terminal and said second motor terminal, and a second inductor connected between said third motor terminal and said grounded center-tap.

28. A motor as in claim 27, including a first motor-run capacitor connected between said first motor terminal and said fourth motor terminal, and a second motor-run capacitor connected between said second motor terminal and said third motor terminal.

29. A motor as in claim 28, including a third switchable temporarily-connected intermittent-duty starting capacitor connected between said first motor terminal and said third motor terminal.

30. In an a-c electrical motor driven by a grounded center-tap single phase power supply and having at least three motor windings of different phases with four motor terminals, said single-phase supply having three terminals, means to connect a first capacitor between a first motor terminal and a second motor terminal, means to connect a first supply terminal to said first motor terminal, means to connect a second capacitor between said second motor terminal and a third motor terminal, means to connect a third capacitor between said third motor terminal and a second supply terminal which is said center-tap, and means to connect a fourth motor terminal to a third supply terminal.

31. A motor as in claim 30, wherein a fourth capacitor is connected between said fourth motor terminal and said first motor terminal.

32. A motor as in claim 30, wherein the supply voltage magnitude between said third supply terminal and said second supply terminal is approximately equal to the supply voltage magnitude between said second supply terminal and said first supply terminal.

33. In an a-c electrical motor driven by a single phase power supply and having at least three motor windings of different phases, said single-phase supply having two terminals, an inductor and a capacitor, a first winding terminal connected to a first supply terminal, a second winding terminal connected to a second supply terminal, the inductor connected between a third winding terminal and said first supply terminal, and the capacitor connected between said second winding terminal and said third winding terminal.

34. An electrical motor as in claim 33, including a second capacitor and a second inductor, a three-terminal single-phase supply, said second capacitor connected between said first winding terminal and a fourth winding terminal, and said second inductor connected between said fourth winding terminal and a third terminal of the single-phase supply.

35. An alternating-current motor having a two-line single-phase power supply, the motor having at least three motor windings of different phases, said motor windings connected in series with four sequential motor terminals 1, 2, 3 and 4, means to connect a first line of said power supply to the first motor terminal 1, means to connect the second line of said power supply to motor terminal 3, means to connect a first capacitor between motor terminal 1 and motor terminal 4, and switchable means to temporarily connect a starting capacitor during starting between motor terminal 3 and motor terminal 4.

36. A motor as in claim 35, wherein said means to connect a starting capacitor is a switchable means which connects said starting capacitor only during the starting transient.

37. A motor as in claim 35, including a timer, wherein said means to connect a starting capacitor is a switchable means which disconnects said starting capacitor after a preselected time interval.

38. A motor as in claim 31, wherein said means to connect a starting capacitor is a switchable means to disconnect said starting capacitor when the motor shaft speed exceeds a preselected value.

39. A motor as in claim 35, a current-sensing means, wherein said means to connect a starting capacitor is a switchable means to disconnect said starting capacitor when the magnitude of the current sensed in one of the windings is less than a preselected value.

40. A motor as in claim 35, with a second starting capacitor, and means to connect said second starting capacitor between motor terminal 3 and one other motor terminal.

41. A motor as in claim 35, with a second starting capacitor, and means to connect said second starting capacitor between motor terminal 2 and one other motor terminal.

42. A motor as in claim 35, wherein the phase of the phasor voltage from terminal 1 to terminal 2 leads the phase of the phasor voltage from terminal 2 to terminal 3 by more than 20 degrees.

43. A motor as in claim 35, wherein the phase of the phasor voltage from terminal 2 to terminal 3 leads the phase of the phasor voltage from terminal 3 to terminal 4 by less than 75 degrees.

44. An alternating-current motor with three motor windings with different voltage phases, three motor terminals, a three-terminal autotransformer, a single-phase supply with at least two lines, a first line connected to a first motor terminal, a second line connected to a second motor terminal, one terminal of said autotransformer connected to said second motor terminal, a second terminal of said autotransformer connected to a third motor terminal, a motor-run capacitor connected between the third terminal of said autotransformer and the said first motor terminal, and a plurality of switchable temporarily-connected intermittent-duty starting capacitors, one of said starting capacitors connected between said first and said third motor terminals.

45. A motor as in claim 44, including a second starting capacitor connected between said second and said third motor terminals.

46. A motor as in claim 44, including a second starting capacitor connected between said first and said second motor terminals.

47. A motor as in claim 45, including a third starting capacitor connected between said first and said second motor terminals.

48. An alternating-current motor as in claim 44, said single-phase supply having a grounded center-tap in addition to the other said two lines, and a second starting capacitor connected between said third motor terminal and said grounded center-tap.

49. A motor as in claim 48, including a third starting capacitor connected between said first motor terminal and said second motor terminal.

50. A motor as in claim 49, wherein each of said starting capacitors is a switchable temporarily-connected intermittent-duty starting capacitor.

* * * * *